United States Patent [19]
Herberholz

[11] 3,874,459
[45] Apr. 1, 1975

[54] OUTRIGGER LOCKUP

[76] Inventor: Joe F. Herberholz, General Delivery Hettinger County, New England, N. Dak. 58647

[22] Filed: Mar. 8, 1973

[21] Appl. No.: 339,335

[52] U.S. Cl. ................... 172/311, 172/456, 16/147
[51] Int. Cl. .................... A01b 15/14, A01b 63/00
[58] Field of Search ................ 172/311, 126–130, 172/315, 316, 456, 466, 481; 16/147; 292/304, DIG. 4

[56] References Cited
UNITED STATES PATENTS

| | | | |
|---|---|---|---|
| 2,489,065 | 11/1949 | Whited | 172/316 X |
| 2,657,623 | 11/1953 | Allen | 172/128 |
| 3,207,342 | 9/1965 | Trojan | 172/456 U X |
| 3,250,333 | 5/1966 | Day | 172/126 |
| 3,274,713 | 9/1966 | Jones | 172/481 X |
| 3,580,340 | 5/1971 | Brown | 172/126 |
| 3,692,121 | 9/1972 | Kenney | 172/456 |

*Primary Examiner*—Robert E. Bagwill
*Assistant Examiner*—Paul T. Sewell
*Attorney, Agent, or Firm*—Merchant, Gould, Smith & Edell

[57] ABSTRACT

A mechanism for installation on large chisel plows and cultivators having outriggers or wings that can be folded upwardly inward so to allow the plow or cultivator to pass through a gateway or upon a road or highway without extending too far out sideways; the present mechanism serving to lock the outrigger in a safe upright position without requiring the operator to leave the tractor seat; the device consisting of an air operated cylinder that activates a pivotable loop that is thus raised so that a stub secured to the outrigger can then be fitted into the loop when it is again lowered.

1 Claim, 6 Drawing Figures

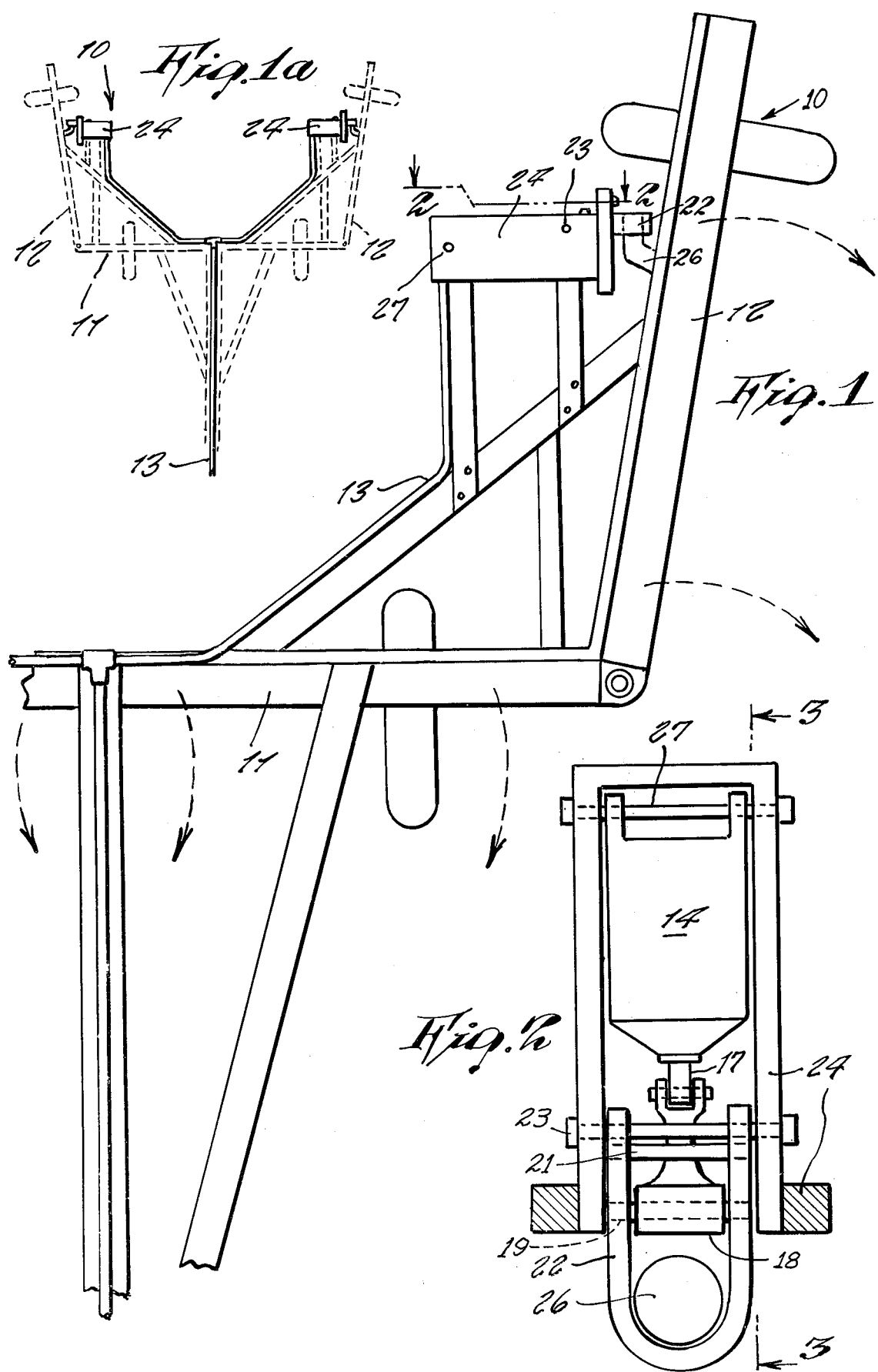

OUTRIGGER LOCKUP

This invention relates generally to agricultural machinery such as cultivators, large chisel plows and the like, that have outriggers that are inwardly pivotable when not in use so that the machine requires a less wide space when travelling.

A principal object of the present invention is to provide a lockup to lock the outrigger in a safe upright position, or unlock the same, without the necessity of the operator leaving the tractor seat, and which also makes it safer for the operator who thus does not have to walk around the upright outrigger before it is locked in place.

Another object is to provide an outrigger lockup which accordingly saves time and is more convenient to the operator.

Yet another object is to provide an outrigger lockup which could be utilized also on other equipment such as road building equipment as for example scrapers and the like that have outriggers.

Other objects are to provide an outrigger lockup which is simple in design, inexpensive to manufacture, rugged in construction, easy to use, and efficient in operation.

These and other objects will be readily evident upon a study of the following specification and the accompanying drawing, wherein:

FIG. 1 is a fragmentary view of an agricultural equipment shown incorporating the present invention.

FIG. 1a is a diagramatic view thereof showing the invention per se.

FIG. 2 is a view in direction 2—2 of FIG. 1 and shown enlarged.

Figure 3:
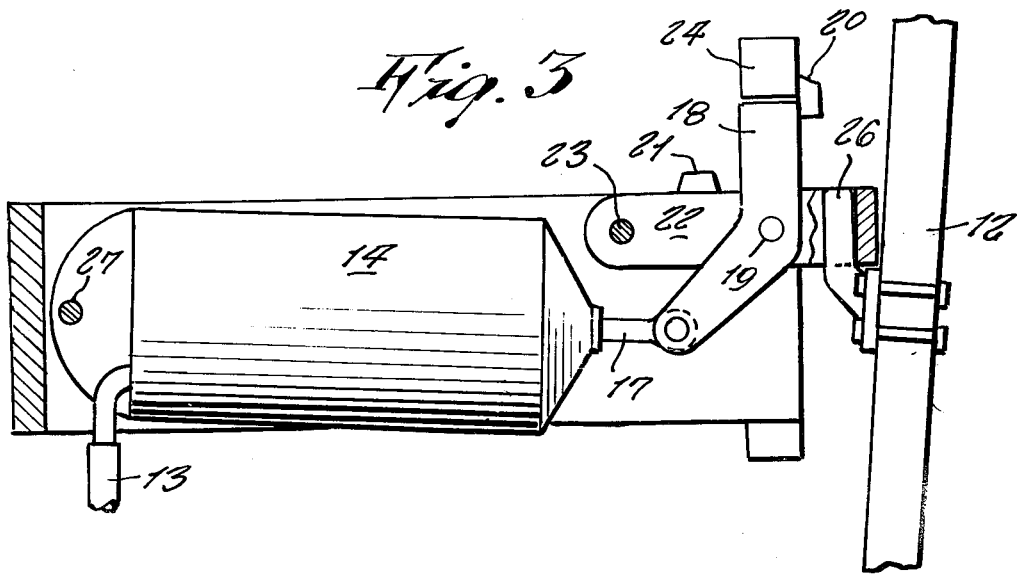
FIG. 3 through FIG. 5 are side cross-sectional views taken generally along line 3—3 of FIG. 2 and illustrating different subsequent positions thereof.
Figure 4:
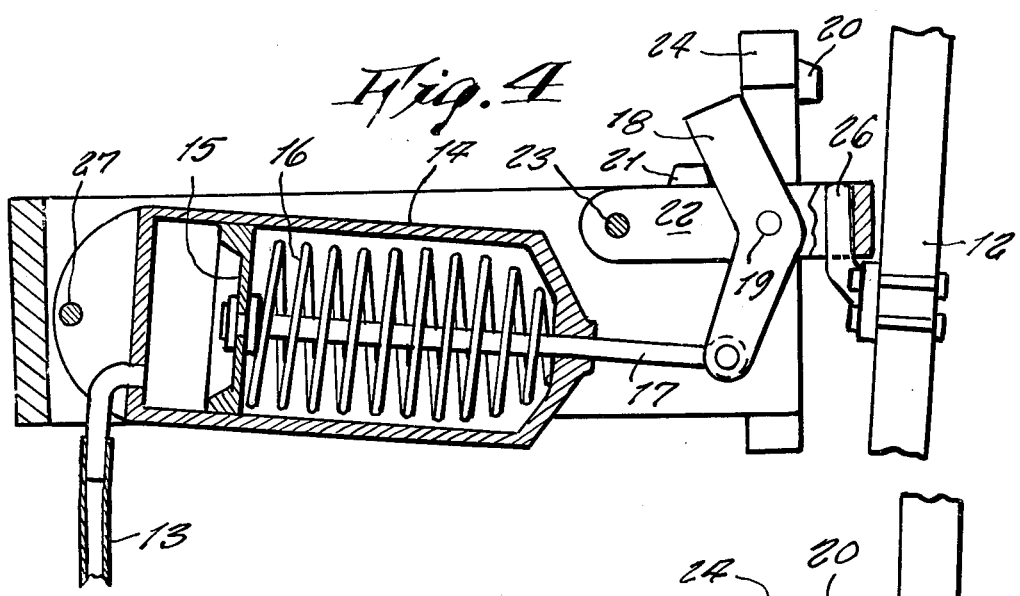
Figure 5:
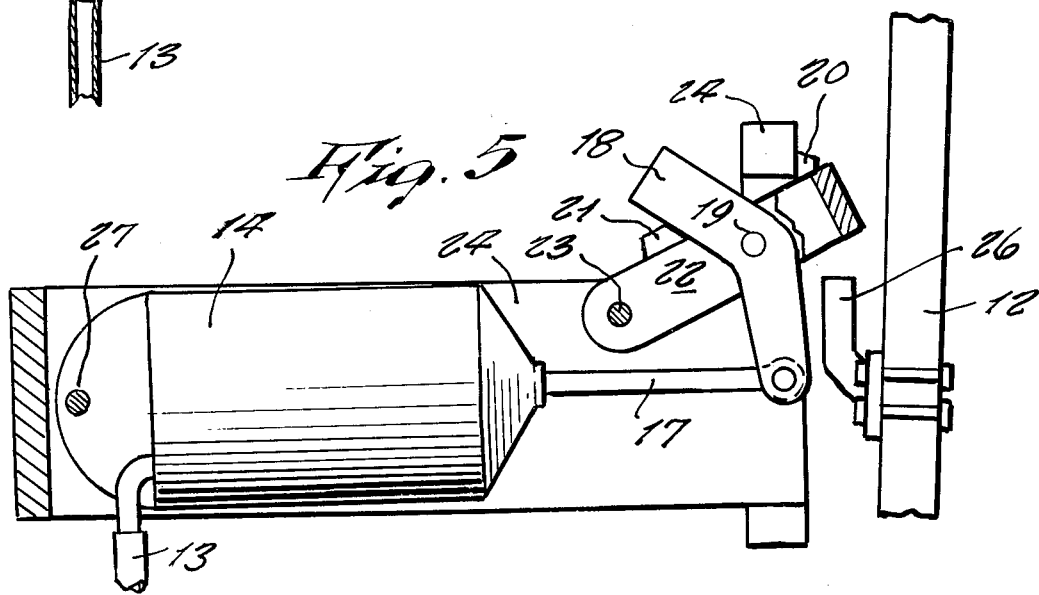

Referring now to the drawings in detail, the reference numberal 10 represents an outrigger lockup according to the present invention which is installed on any type of agricultural or other equipment 11 that has outriggers 12 that are upwardly, inwardly pivotable so to take up less width when the equipment is being moved particularly in narrow areas such as along roads or through gates. When these outriggers are folded inward, they are raised and must be pinned to be held in place.

The outrigger lockup necessitates a small air compressor and small pressure tank to be installed on the tractor from which hoses 13 extend to air cylinders 14 and to which compressed air is controlled by a two-way valve so to activate a piston 15 urged against compression coil spring 16 inside the cylinder. Piston rod 17 pushes one end of a lock latch 18 pivotable about pin 19 so to clear the frame and a latch stop 20 with which frame 24 defines a locking recess. Further pushing of piston rod 17 now causes lock latch 18 now contacting stop 21 on upper edge of loop 22 to swing back over the stop 21 so that the loop pivots upwardly about a pin 23 supported in stationary frame 24, the loop thus abutting the frame and being in position to clear a stub 26 secured to the outrigger if the outrigger is intended to be then lowered, or the loop being in position to receive the stub if the outrigger is intended to be secured in raised position.

The cylinder at one end is pivotable about a pin 27 secured to frame 24. When air pressure is released, the spring 16 causes the piston rod to pull back in and the loop to lower again.

It is to be noted that when the lock latch 18 is in the locking recess under the frame 24 and abutting latch stop 20, the stub 26 cannot accidentally be unhooked by the loop.

The outrigger can be raised or lowered by hydraulic power.

The air compressor is best powered by an electric or manifold pump because it is automatic and keeps pressure at a set number of pounds. The air can be used for other purposes also, such as blowing out dust from an air cleaner or pumping up tires.

I claim:

1. In an outrigger lockup the combination of a pneumatically operated cylinder activating a mechanism securing a stub affixed on a pivotable outrigger supported on an agricultural equipment, said cylinder being connected to an air hose leading from an air tank and air compressor mounted on a tractor, said outrigger lockup eliminating need of manual locking by an operator to leave a tractor seat and walk around an upright outrigger before it is locked, said mechanism comprising a U-shaped loop pivotally secured at one end to a stationary frame of said agricultural equipment, the other end of said loop releasably hooking around said outrigger stub, a longitudinal center of said loop pivotally engaging a longitudinal center of a lock latch, an end of said lock latch being pivotally connected to a spring loaded piston rod of said pneumatic cylinder, a rear end of said cylinder being pivotally supported on said stationary frame, said stationary frame including a locking recess into which an opposite end of said lock latch is receivalbe, a first stop integral with one side of said recess so to form a corner in which said lock latch opposite end abuts when said loop is in a locked position around said stud, and a second stop being integral with said loop, whereby when said piston pushes said lock latch said opposite end of said lock latch is pivoted outward of said recess and abuts said second stop so that continued push of said piston causes said lock latch to roll around said second stop, thus pivoting said loop therewith and lift it from around said stud.

* * * * *